(12) United States Patent
Argumedo et al.

(10) Patent No.: US 6,802,469 B2
(45) Date of Patent: Oct. 12, 2004

(54) TAPE CARTRIDGE COMPRISING A REEL LOCK MECHANISM

(75) Inventors: Armando J. Argumedo, Tucson, AZ (US); Edwin R. Childers, Tucson, AZ (US); Richard A. West, Corona, AZ (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 10/356,993

(22) Filed: Feb. 3, 2003

(65) Prior Publication Data

US 2004/0149849 A1 Aug. 5, 2004

(51) Int. Cl.[7] .............................................. G11B 23/04
(52) U.S. Cl. ..................... 242/338.1; 242/348; 360/132
(58) Field of Search ............................. 242/338.1, 343, 242/348; 360/132

(56) References Cited

U.S. PATENT DOCUMENTS

| | | | |
|---|---|---|---|
| 4,879,614 A | 11/1989 | Nakagome | 360/93 |
| 5,366,173 A | 11/1994 | Lammers et al. | 242/338.1 |
| 5,515,223 A | 5/1996 | Grittmann et al. | 360/128 |
| 5,893,527 A | 4/1999 | Mizutani et al. | 242/348 |
| 5,901,916 A | 5/1999 | McAllister et al. | 242/348 |
| 6,113,020 A | 9/2000 | Nayak | 242/348 |

FOREIGN PATENT DOCUMENTS

| | | |
|---|---|---|
| EP | 0284687 A2 | 10/1988 |
| GB | 2236092 A | 1/1991 |
| JP | 3041651 A | 2/1991 |
| JP | 11149748 A | 6/1999 |
| JP | 11149749 A | 6/1999 |

Primary Examiner—John Q. Nguyen
(74) Attorney, Agent, or Firm—Dale F. Regelman

(57) ABSTRACT

A tape cartridge comprising a housing, a tape reel disposed within that housing, where that tape reel is capable of rotation around a first axis, and where that tape reel includes a hub and a reel coupling which is engageable with a motor coupling for rotation of the tape reel. The tape cartridge further includes a brake plate disposed within the hub, where that brake plate is capable of moving in a first direction and in an opposing second direction along the first axis, but where the brake plate is not capable of rotation around the first axis. The brake plate includes a first side, an opposing second side, a brake plate gear disposed on the second side, and a fixturing assembly disposed on the first side. The tape cartridge further includes a clutch plate disposed within the hub, where that clutch plate is capable of moving in a first direction and in an opposing second direction along the first axis, and where that clutch plate is capable of rotation around the first axis. The clutch plate includes a first surface, an opposing second surface, where the second side of the clutch plate is rotatably disposed on the second side of the brake plate, and where one or more release pins are disposed on the first surface of the clutch plate, and where those release pins each include a distal end which extends through, and outwardly from, the cartridge.

26 Claims, 19 Drawing Sheets

FIG. 1
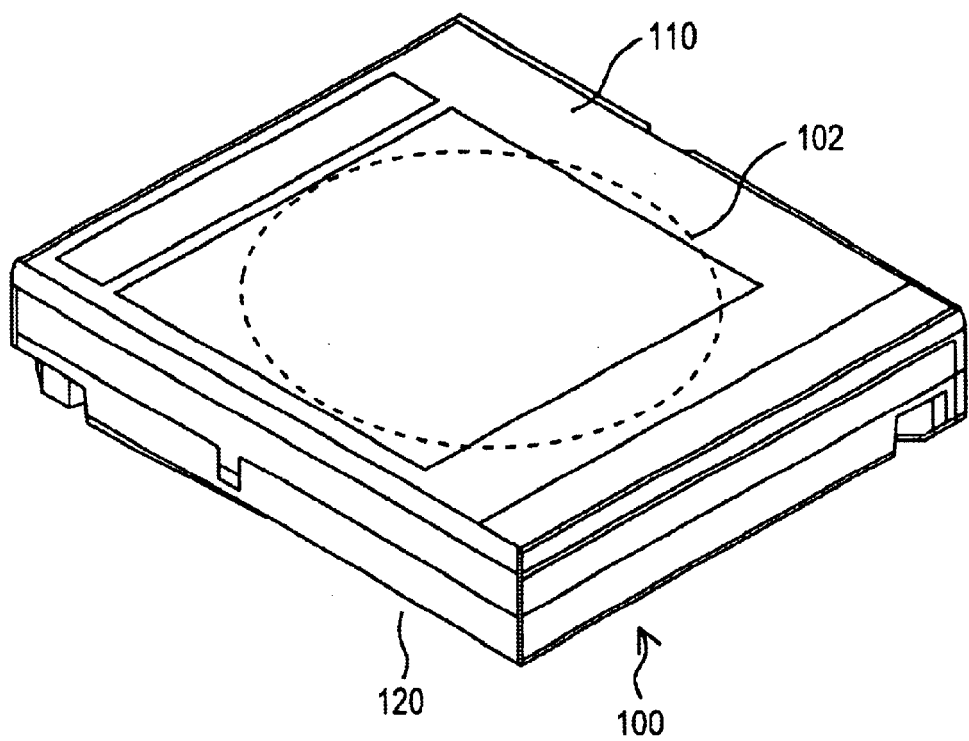
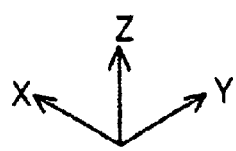

FIG. 3
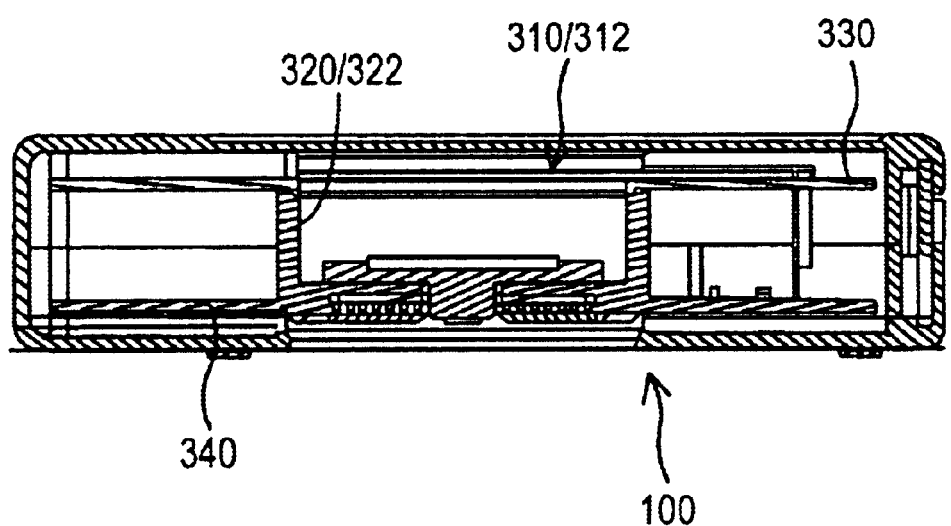
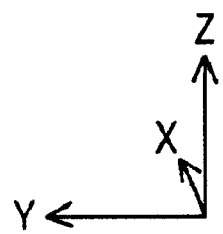

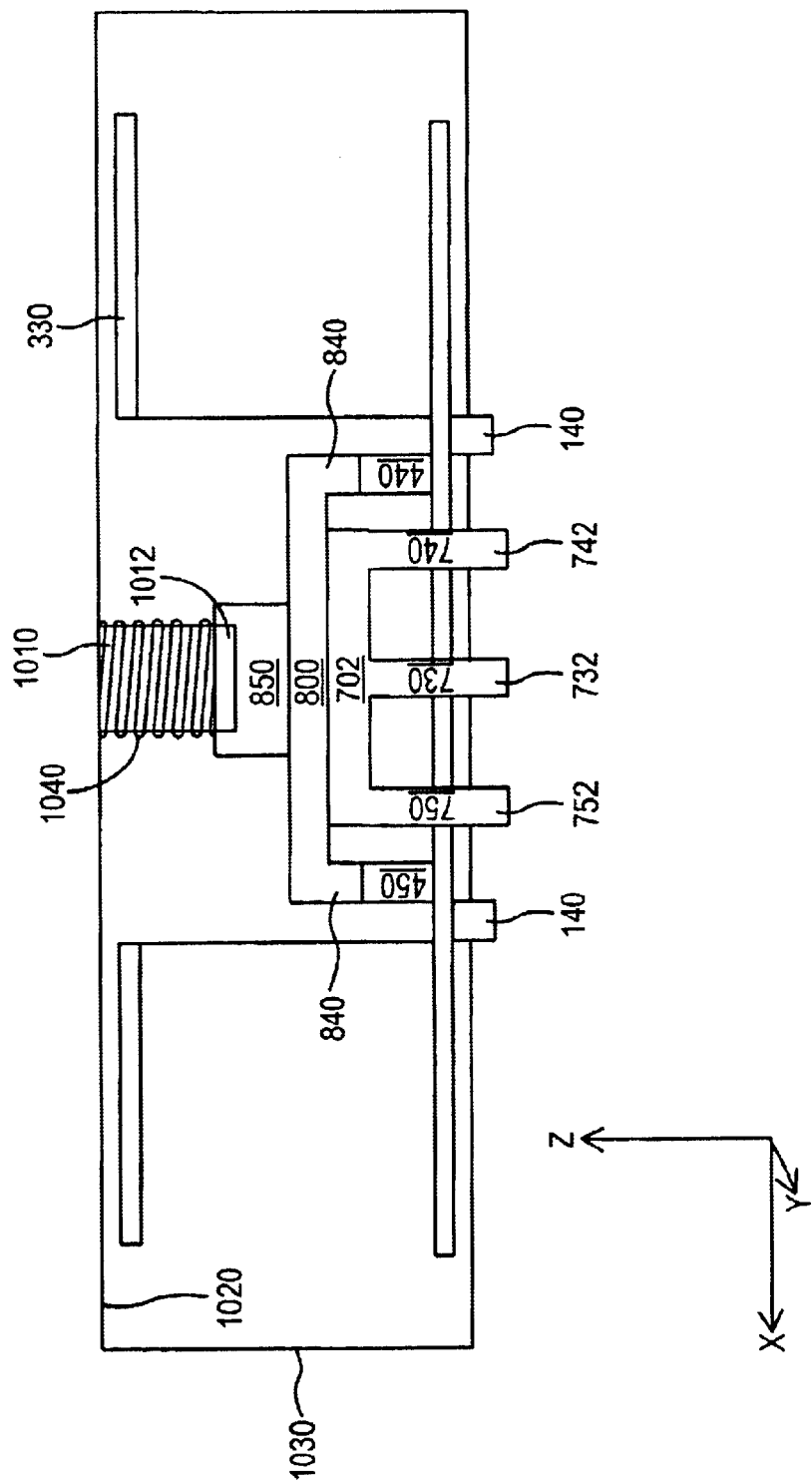

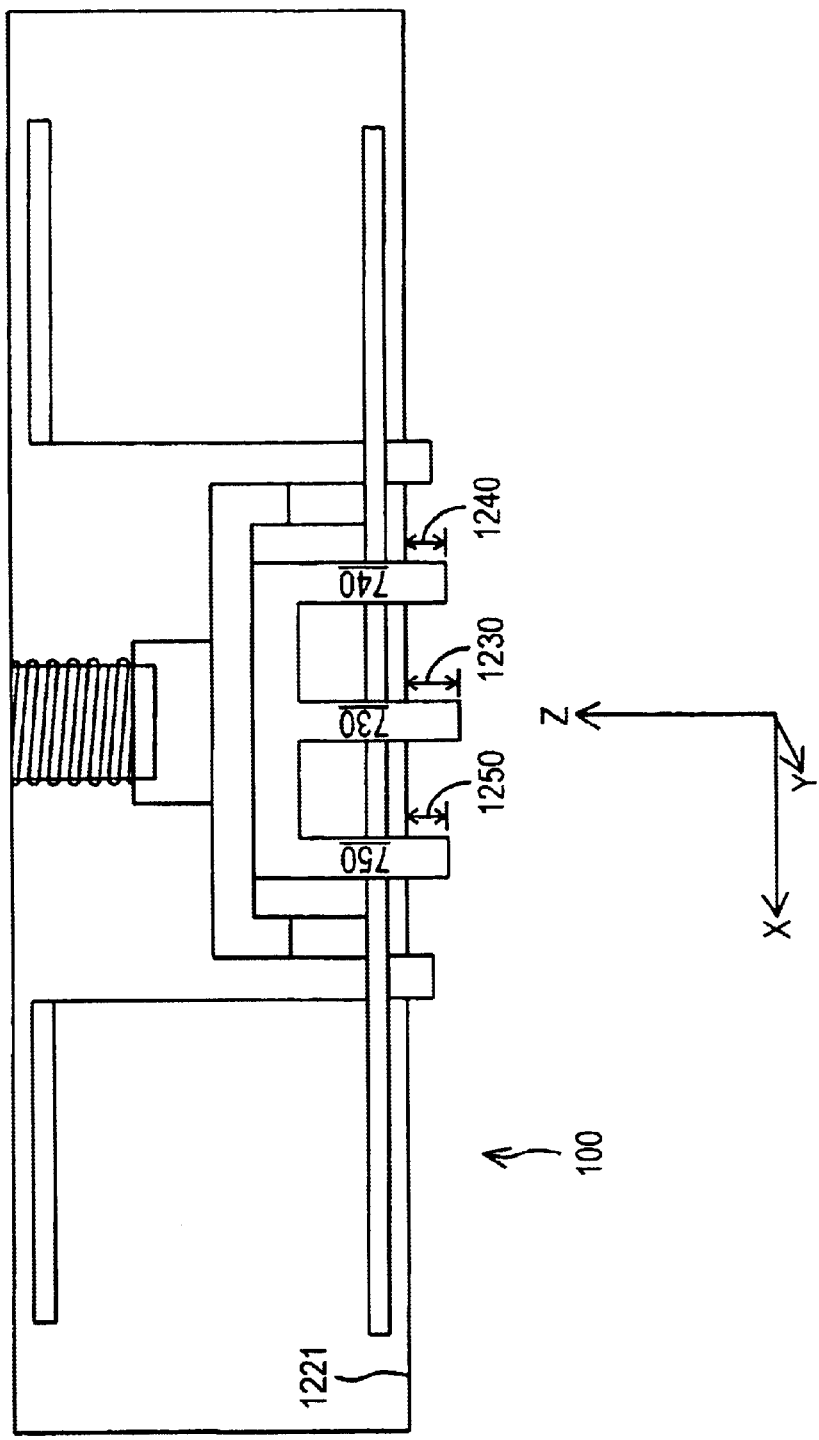

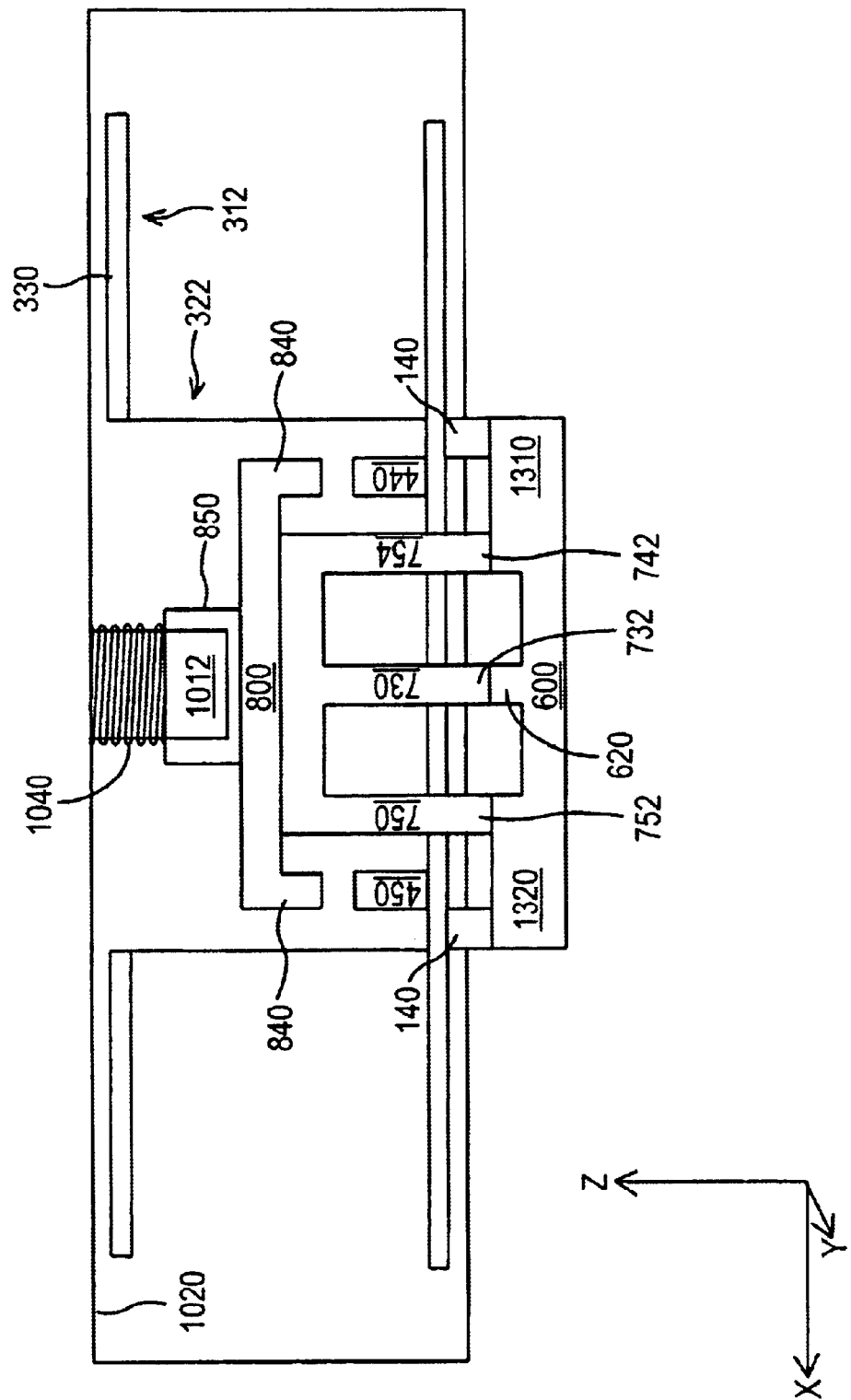

TAPE CARTRIDGE COMPRISING A REEL LOCK MECHANISM

FIELD OF THE INVENTION

This invention relates to the field of tape storage cartridges. In certain embodiments, Applicants' invention relates to a tape cartridge which includes a single release pin tape reel lock mechanism. In certain embodiments, Applicants' invention relates to a tape reel lock mechanism which includes a center release pin in combination with a plurality of peripheral release pins such that Applicants' tape cartridge is compatible with differing of tape drive mechanisms.

BACKGROUND OF THE INVENTION

Tape media, such a magnetic tape, is a common medium for the storage of data to be utilized by a computer. Magnetic tape has found widespread use as a data storage medium because it provides a relatively inexpensive solution for storing large amounts of data. Magnetic tape is typically stored on cartridges of differing types and sizes. One reason for the variety of cartridge types is the variety of tape drives used to read/write information to the information storage medium disposed in the cartridge.

Tape cartridges are comprised essentially of a cartridge shell which houses a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges. The tape cartridge is inserted into a tape drive mechanism which automatically threads the magnetic tape from the tape cartridge through the tape guide mechanism of the tape drive assembly. The tape is then available to the tape drive mechanism for the reading and writing of data.

Prior to insertion into a tape drive unit, rotation of the reel within the tape cartridge may be restricted by a reel lock mechanism. In order to release the reel, and thereby allow the tape to be withdrawn from the cartridge, the tape cartridge must be inserted into a compatible tape drive. A compatible tape drive includes a means to disengage the reel lock mechanism disposed within the tape cartridge.

Certain prior art tape cartridges are formed to include a plurality of release pins each having an external end disposed around the periphery of a reel coupling mechanism. A compatible tape drive includes a motor coupling that mates with the reel coupling, such that one or more motor coupling gear teeth move each of the plurality of release pins inwardly thereby releasing the reel lock mechanism. Other prior art tape cartridge are formed to include a single release pin having an external end disposed at the center of the reel mechanism. Compatible tape drives include a means to urge that single release pin inwardly thereby releasing the reel lock mechanism.

Tape cartridges containing magnetic tape are often used in automated data storage and retrieval systems. Such data storage and retrieval systems are known for providing cost effective access to large quantities of stored media. One (or more) accessor typically accesses the tape cartridges from a plurality of storage slots and delivers the accessed tape cartridge to a tape drive for reading and/or writing data on the accessed tape cartridge. Suitable electronics both operate the accessor and operate the tape drives to transmit and/or receive data from an attached on-line host computer system.

Many data storage and retrieval systems, however, include tape drives that are only compatible with, i.e. that can release, only one reel lock mechanism.

Because prior art tape cartridges are compatible with only one configuration of tape drive, those prior art tape cartridges often cannot be used in multiple data storage and retrieval systems. What is needed is a tape cartridge that is compatible with multiple tape drive configurations. Use of such a universal tape cartridge would allow a magnetic tape to be imported into a data storage and retrieval systems regardless of the configuration of the tape drives disposed therein.

SUMMARY OF THE INVENTION

Applicants' invention includes a tape cartridge comprising a housing, a tape reel disposed within that housing, where that tape reel is capable of rotation around a first axis, and where that tape reel includes a hub and a reel coupling which is engageable with a motor coupling for rotation of the tape reel. Applicants' tape cartridge further includes a brake plate disposed within the hub, where that brake plate is capable of moving in a first direction and in an opposing second direction along the first axis, but where the brake plate is not capable of rotation around the first axis. Applicants' brake plate includes a first side, an opposing second side, a brake plate gear disposed on the second side, and a fixturing assembly disposed on the first side.

Applicants' tape cartridge further includes a clutch plate disposed within the hub, where that clutch plate is capable of moving in a first direction and in an opposing second direction along the first axis, and where that clutch plate is capable of rotation around the first axis. Applicants' clutch plate includes a first surface, an opposing second surface, where the second surface of the clutch plate is rotatably disposed on the second side of the brake plate, and where one or more release pins are disposed on the first side of the clutch plate, and where those release pins each include a distal end which extends through, and outwardly from, the cartridge.

BRIEF DESCRIPTION OF THE DRAWINGS

The invention will be better understood from a reading of the following detailed description taken in conjunction with the drawings in which like reference designators are used to designate like elements, and in which:

FIG. 1 is a first perspective view of Applicants' tape cartridge;

FIG. 3 is a cross-sectional view of Applicants' tape cartridge;

FIG. 12A is a cross-sectional view of a first embodiment of Applicants' tape cartridge comprising a four release pin reel lock mechanism, where the tape reel is in a locked configuration;

FIG. 12B is a cross-sectional view of a second embodiment of Applicants' tape cartridge comprising a four release pin reel lock mechanism, where the tape reel is in a locked configuration;

FIG. 13A is a cross-sectional view of the tape cartridge of FIG. 12A in combination with a first configuration of tape drive motor coupling;

DESCRIPTION OF THE PREFERRED EMBODIMENTS

Referring to the illustrations, like numerals correspond to like parts depicted in the figures. The invention will be described as embodied in a portable data storage cartridge disposed in an information storage and retrieval system. The following description of Applicant's apparatus and method is not meant, however, to limit Applicant's invention to data processing applications, as the invention herein can be applied to tape cartridges in general.

Figure 2:
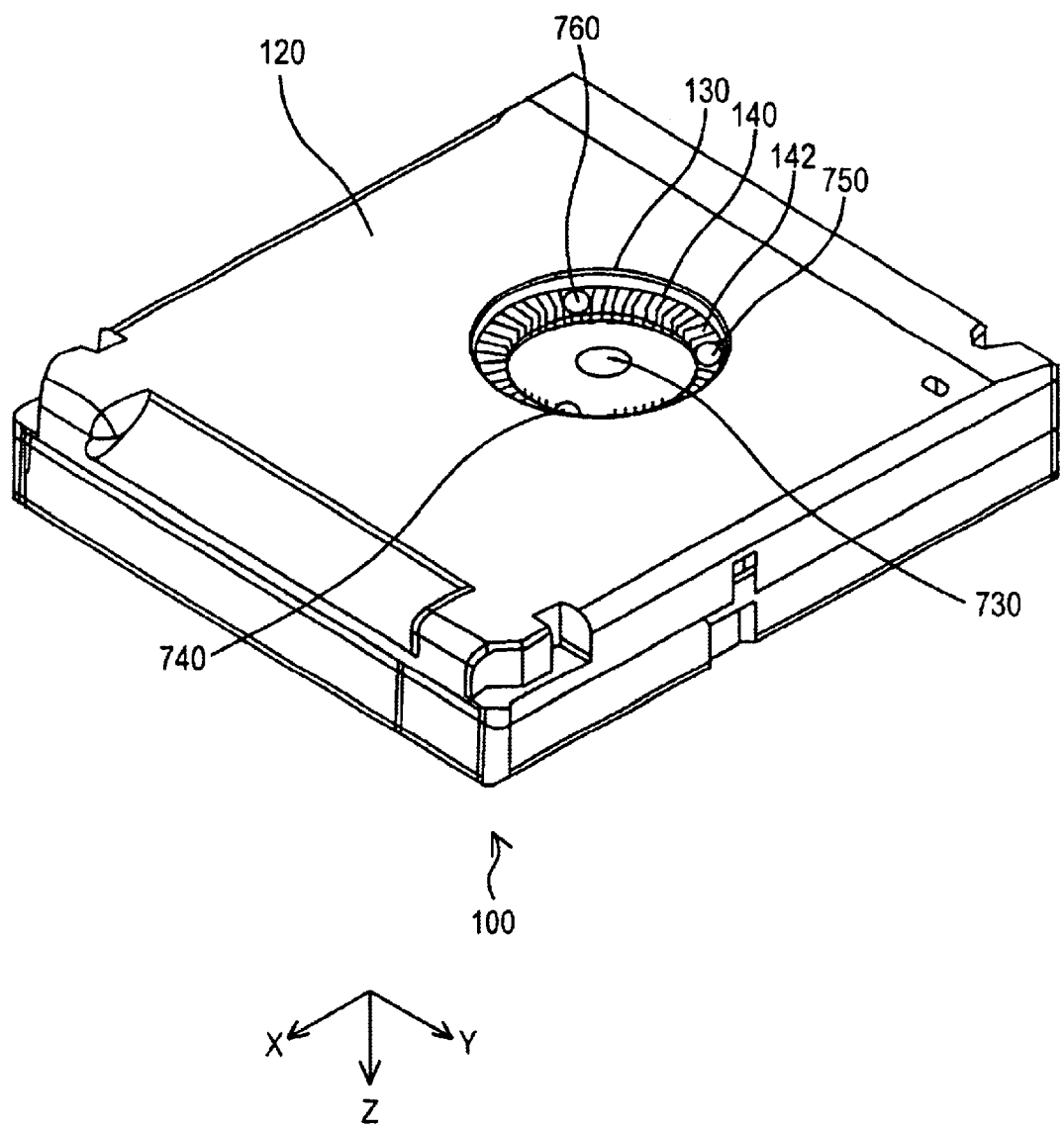
FIG. 2 is a second perspective view of Applicants' tape cartridge.

FIGS. 1 and 2 show perspective views of Applicants' tape cartridge 100. Applicants' reel lock assembly is disposed within housing 100. In certain embodiments, Applicants' reel lock mechanism comprises a single release pin. In other embodiments, Applicants' reel lock mechanism comprises more than one release pin. Tape storage medium 102 is internally disposed within housing 100. There are various features not shown on housing 100, such as locating notches, write-inhibiting switches, and the like. Housing 100 is only exemplary, and certain housing embodiments of present invention are applicable to any configuration of housing 100, and are useful for enclosing various tape storage media Housing 100 includes side 110 and opposing side 120.

FIG. 3 shows a cross-section view of cartridge 100. In the single release pin embodiment of Applicants' invention, tape reel 310 comprises hub 320, first flange 330 (FIGS. 3, 4A, 4B, 10, 12A, 13A), and second flange 340. In the multiple release pin embodiment of Applicants' invention, tape reel 312 comprises hub 322, first flange 330, and second flange 340. Flanges 330 and 340 connect to, and extend radially outward from, hub 310/312 forming a channel between them in which tape 102 (not shown in FIG. 3) is contained as that tape is wound around hub 320/322.

Figure 5B:
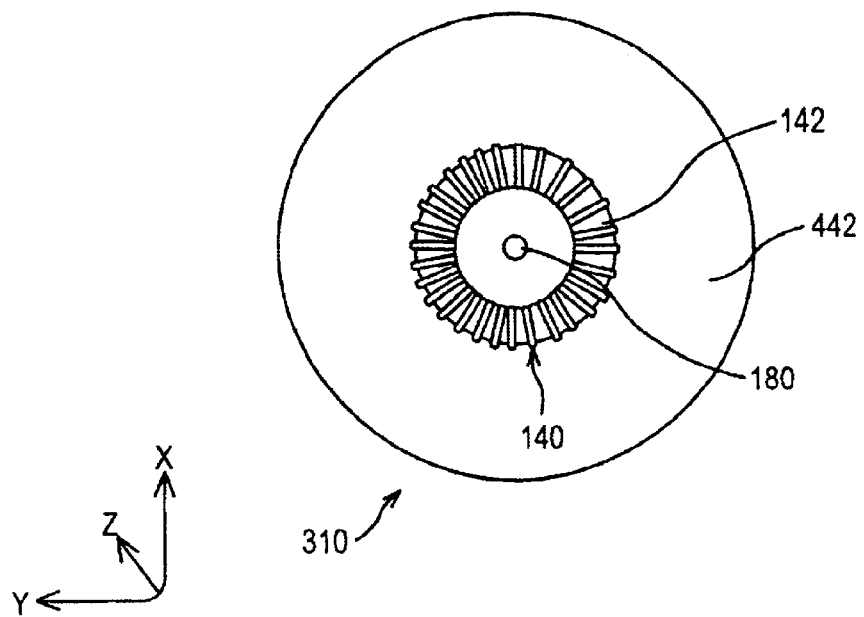
FIG. 5B is a bottom view of the tape reel of FIG. 4A.
Figure 5D:
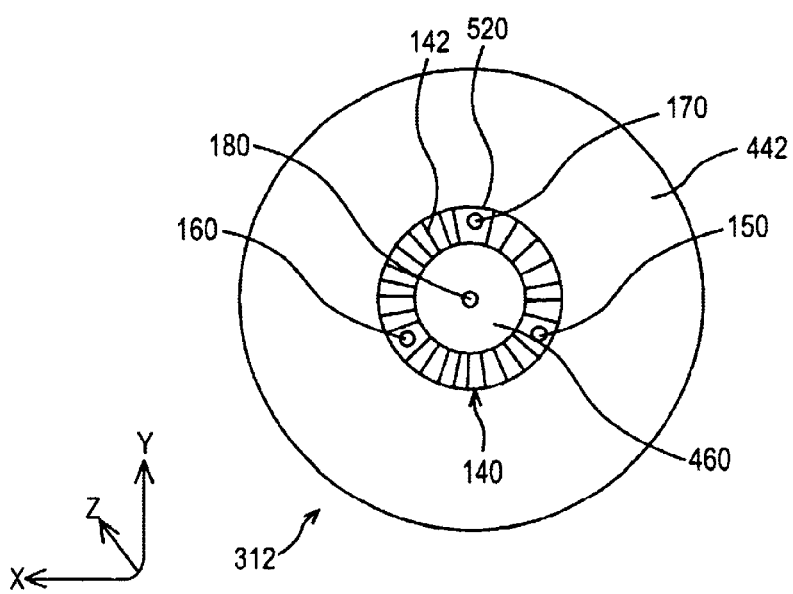
FIG. 5D is a bottom view of the tape reel of FIG. 4B.
Figure 6A:
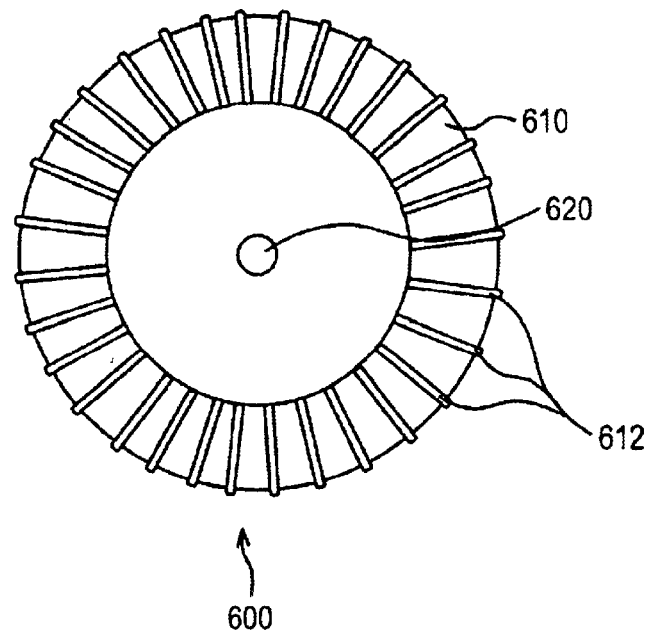
FIG. 6A is a top view of a first type of motor coupling.
Figure 6B:
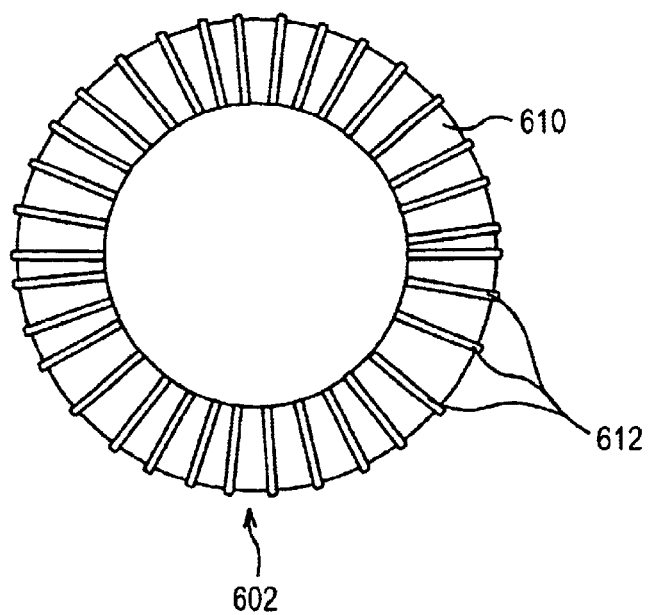
FIG. 6B is a top view of a second type of motor coupling.

Referring again to FIG. 2, side 120 of housing 100 includes aperture 130. Reel coupling 140 (FIGS. 2, 4A, 4B, 5B, 5D, 10, 11, 12A, 13A, 13B) is rotatably disposed within aperture 130. Referring to FIGS. 2, 5B, and 5D, reel coupling 140 comprises a circular ring of gear teeth 142. Reel coupling 140 mates with motor coupling 600/602 (FIGS. 6A, 6B).

Figure 4A:
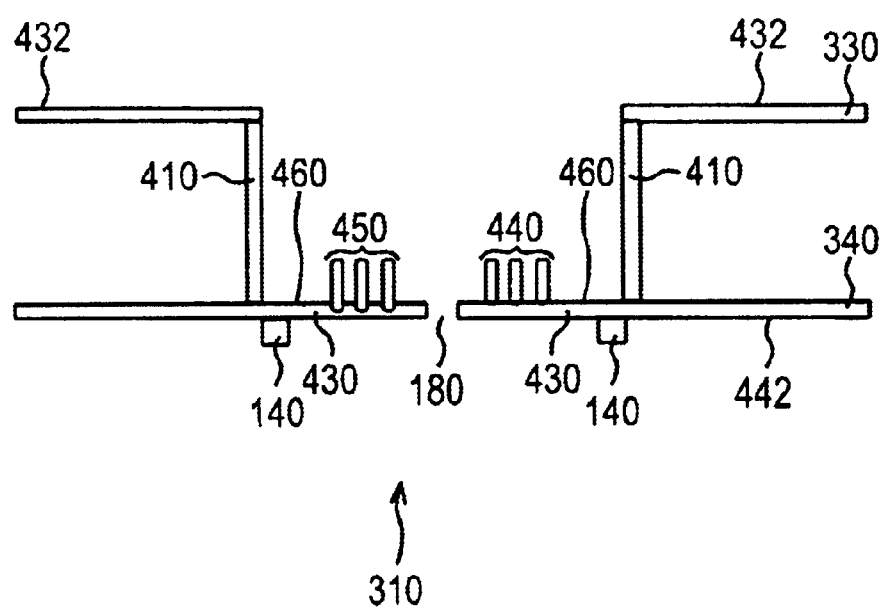
FIG. 4A is a cross-sectional view of a first embodiment of Applicants' tape reel.

FIG. 4A shows a cross section view of reel 310 (FIG. 3). Hub 320 (FIG. 3) includes circular wall 410 and floor 430. Hub 320 is cylindrical with a diameter 420. Flange 330 includes outer surface 432. FIG. 5A is a top view of reel 310, looking in the −Z direction, showing top surface 432 of flange 330 (FIG. 3), the top edge of circular wall 410, and interior surface 460 of hub floor 430. Referring to FIGS. 4A and 5A, hub floor 430 is formed to include aperture 180 (FIGS. 4A, 4B, 5A, 5B, 5C, 5D) located at the center of hub 320, i.e. at the axis of rotation of reel 310. In addition, three sets of gear teeth are symmetrically disposed on interior surface 460. First plurality 440 (FIGS. 4A, 4B, 5A, 5C, 10, 11, 12A, 13A) of gear teeth, second plurality of gear teeth 450 (FIGS. 4A, 4B, 5A, 5C, 10, 11, 12A, 13A), and third plurality of gear teeth 465 (FIGS. 5A, 5C), each extend along floor 460 from circular wall 410 inwardly toward the center of hub 310. In the embodiment shown in FIG. 4A, each of the three sets of gear teeth 440, 450, and 465, include three teeth. In the embodiment shown in FIG. 5A, each of the three sets of gear teeth 440, 450, and 465, include five gear teeth. In certain embodiments, each of the three sets of gear teeth 440, 450, and 465, include four gear teeth. In certain embodiments, each of the three sets of gear teeth 440, 450, and 465, include fewer than three gear teeth. In certain embodiments, each of the three sets of gear teeth 440,450, and 465, includes more than five gear teeth.

Figure 4B:
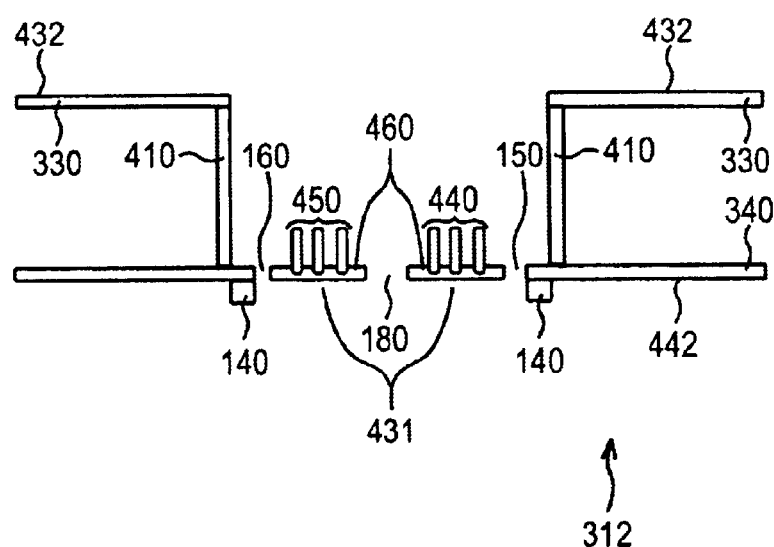
FIG. 4B is a cross-sectional view of a second embodiment of Applicants' tape reel.
Figure 5A:
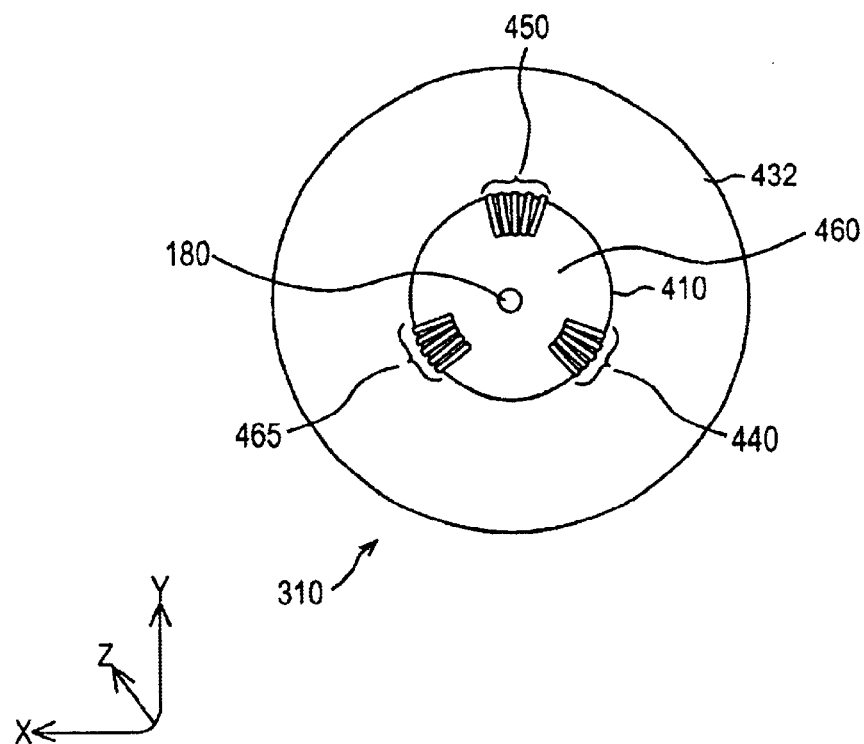
FIG. 5A is a top view of the tape reel of FIG. 4A.
Figure 5C:
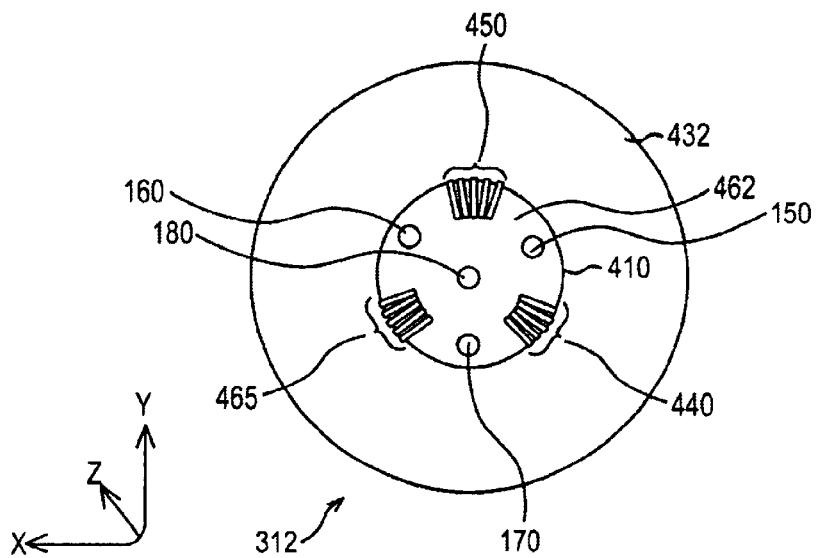
FIG. 5C is a top view of the tape reel of FIG. 4B.

FIG. 4B shows a cross section view of reel 312 (FIG. 3). Hub 322 (FIG. 3) includes circular wall 410 and floor 431. Hub 322 is cylindrical with a diameter 420. Flange 330 (FIGS. 3, 4A, 4B, 10, 12A, 13A) includes outer surface 432. FIG. 5C is a top view of reel 312, looking in the −Z direction, showing top surface 432 of flange 330 (FIG. 3), one edge of circular wall 410, and interior surface 462 of hub floor 431. Referring to FIGS. 4B and 5C, three sets of gear teeth are symmetrically disposed on interior surface 462. First plurality 440 of gear teeth, second plurality of gear teeth 450, and third plurality of gear teeth 465, each extend along floor 462 from circular wall 410 inwardly toward the center of hub 312. In the embodiment shown in FIG. 4B, each of the three sets of gear teeth 440, 450, and 465, include three teeth. In the embodiment shown in FIG. 5C, each of the three sets of gear teeth 440, 450, and 465, include five gear teeth. In certain embodiments, each of the three sets of gear teeth 440, 450, and 465, include four gear teeth. In certain embodiments, each of the three sets of gear teeth 440, 450, and 465, include fewer than three gear teeth. In certain embodiments, each of the three sets of gear teeth 440, 450, and 465, include more five gear teeth.

In hub 312, floor portion 431 is formed to include four apertures extending therethrough. Aperture 180 (FIGS. 4A, 4B, 5A, 5B, 5C, 5D) is located at the center of hub 310. Apertures 150, 160, and 170, are symmetrically located adjacent wall 410 such that each of those apertures is equidistant from two neighboring sets of gear teeth disposed on surface 460.

Referring now to FIG. 6A, certain tape drives include a drive motor coupling having the configuration shown in drive motor coupling 600 which comprises gear ring 610 which includes a plurality of gear teeth 612, in combination with member 620 extending outwardly from motor coupling 600. Referring to FIG. 6B, other tape drives include a drive motor coupling having the configuration shown in drive motor coupling 602 which includes a plurality of gear teeth 612, but do not include member 620 (FIG. 6A).

Figure 7A:
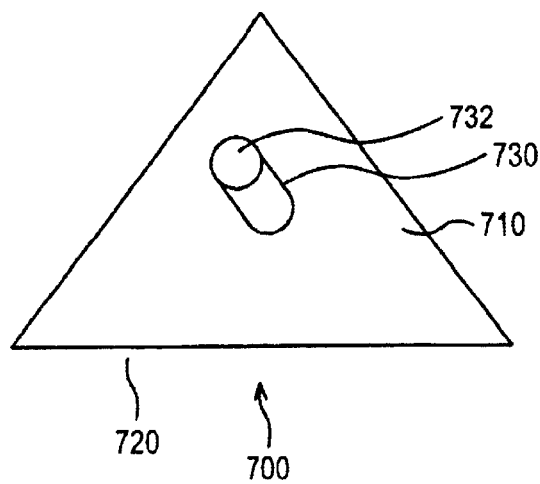
FIG. 7A is a perspective view of a first embodiment of Applicants' clutch plate.

Applicants' reel lock mechanism further includes a clutch plate. FIG. 7A shows clutch plate 700 which is used in Applicants' single release pin embodiment. Clutch plate 700 has the shape of an equilateral triangle. Clutch plate 700 includes first surface 710 and opposing second surface 720. Release pin 730 (FIGS. 7A, 7B, 10, 11, 12A, 12B, 13A, 13B) is disposed at the center of clutch plate 700 with distal end 732 (FIGS. 7A, 7B, 10, 11, 12A, 13A) extending outwardly from side 710.

Figure 7B:
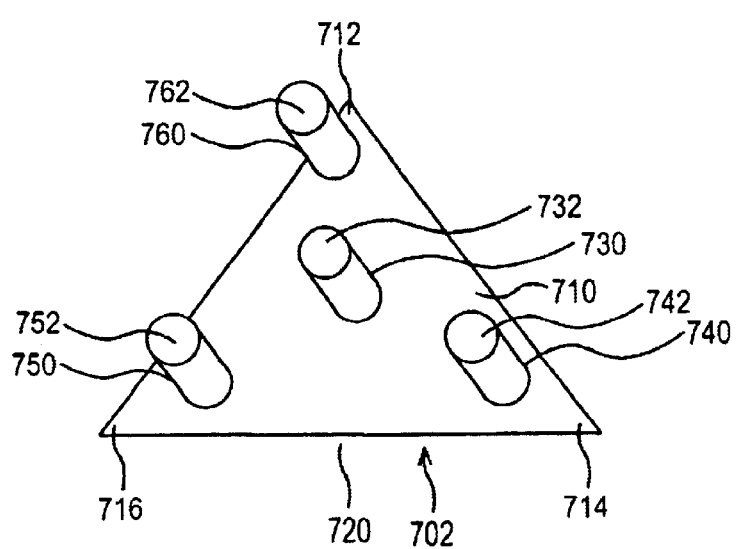
FIG. 7B is a perspective view of a second embodiment of Applicants' clutch plate.

FIG. 7B shows clutch plate 702 which is used in Applicants' four release pin embodiment. Clutch plate 702 has the shape of an equilateral triangle with three corners 712, 714, and 716. Clutch plate 702 includes first surface 710 and opposing second surface 720. Four brake release pins are disposed on surface 710 and extend outwardly therefrom. Release pin 730 (FIGS.7A, 7B, 10, 11, 12A, 12B, 13A, 13B) is disposed at the center of clutch plate 700 with distal end 732 (FIGS. 7A, 7B, 10, 11, 12A, 13A) extending outwardly from surface 710. Release pin 740 (FIGS. 7B, 12A, 13A, 13B) is disposed on surface 710 at corner 714 with distal end 742 (FIGS. 7B, 12A, 13A) extending outwardly from surface 710. Release pin 750 (FIGS. 7B, 12A, 13A, 13B) is disposed on surface 710 at corner 716 with distal end 752 (FIGS. 7B, 12A, 13A, 13B) extending outwardly from surface 710. Release pin 760 is disposed on surface 710 at corner 712 with distal end 762 extending outwardly from surface 710.

Figure 8A:
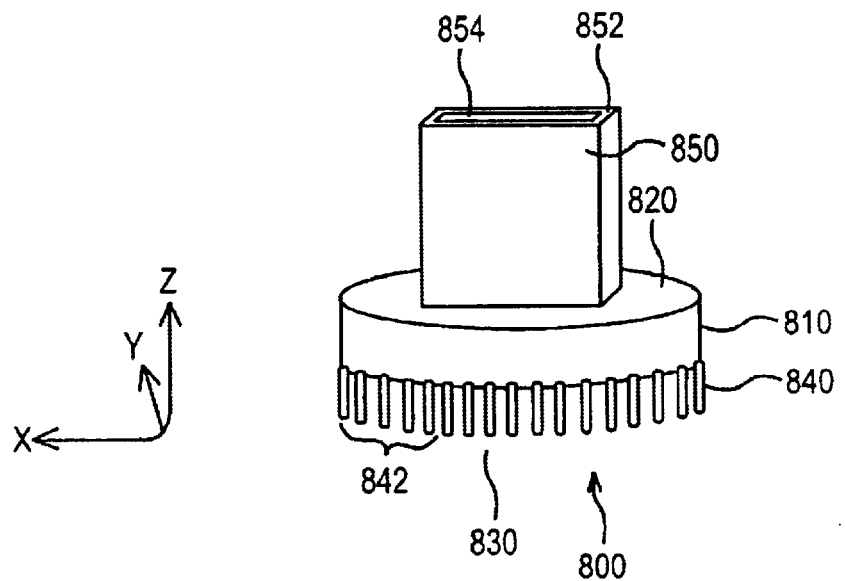
FIG. 8A is a perspective view of Applicants' brake plate.
Figure 8B:
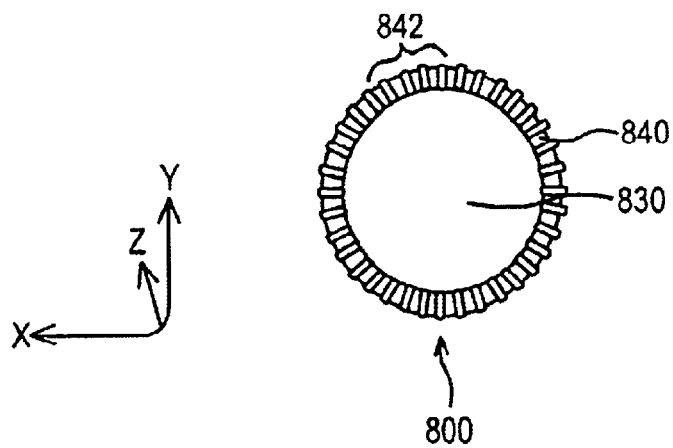
FIG. 8B is a bottom view of Applicants' brake plate.
Figure 9:
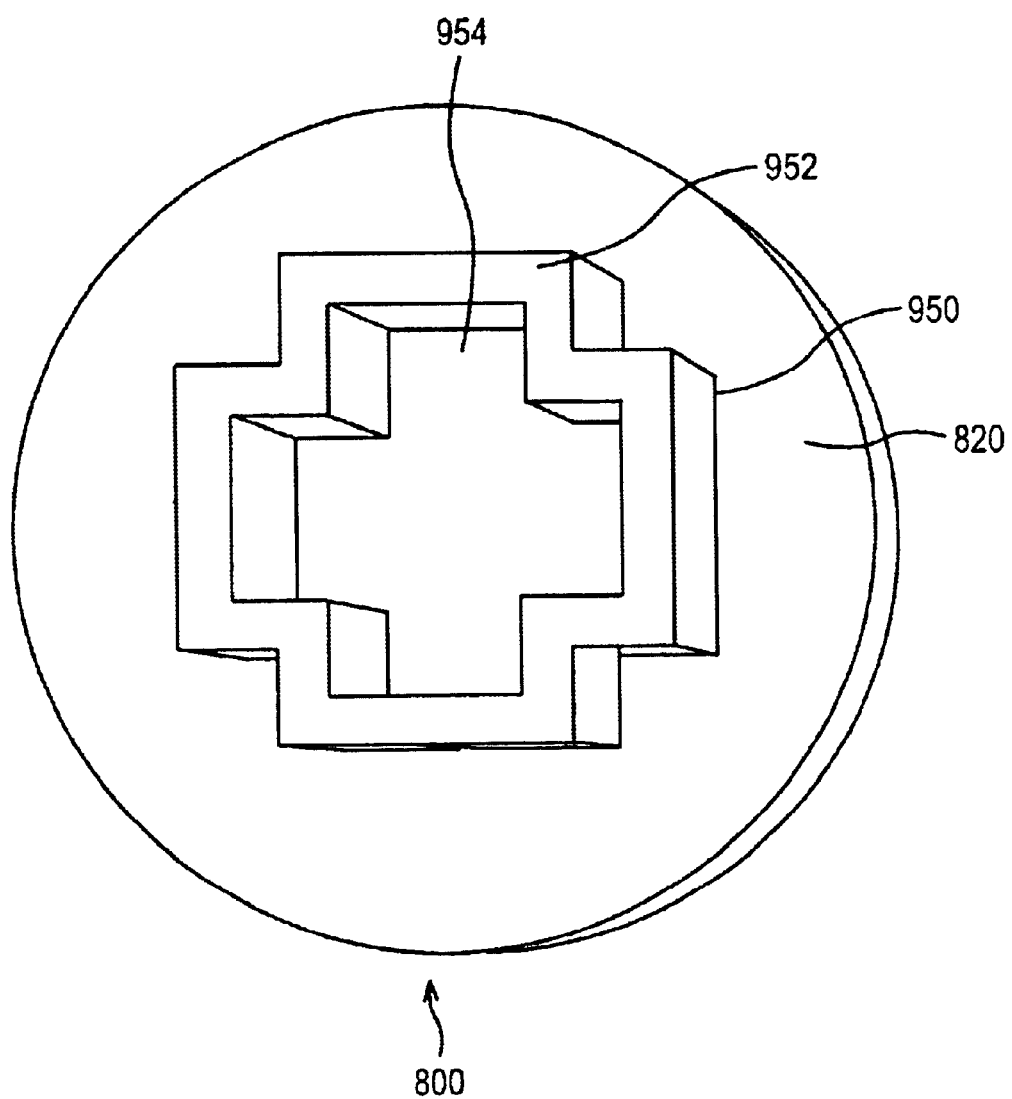
FIG. 9 is a top view of one embodiment of Applicants' brake plate.

Referring now to FIGS. 8A and 8B, Applicants' reel lock mechanism further includes brake plate 800 (FIGS. 8A, 8B, 9, 10, 11, 12A, 13A, 13B). Brake plate 800 includes cylindrical member 810 having a first side 820 and an opposing second side 830. Circular brake gear 840 is disposed on second side 830. Brake gear 840 includes a plurality of gear teeth 842. Brake plate 800 further includes assembly 850 (FIGS. 8A, 10, 12A, 13A, 13B) disposed on side 820 and extending outwardly therefrom. In certain embodiments, assembly 850 comprises a rectangular member. In certain embodiments, assembly 850 is formed to include an aperture 854 in distal end 852. Referring now to FIG. 9, in certain embodiments assembly 850 comprises a multi-sided structure 950 which is formed to include multi-sided aperture 954 in distal end 952.

Figure 10:
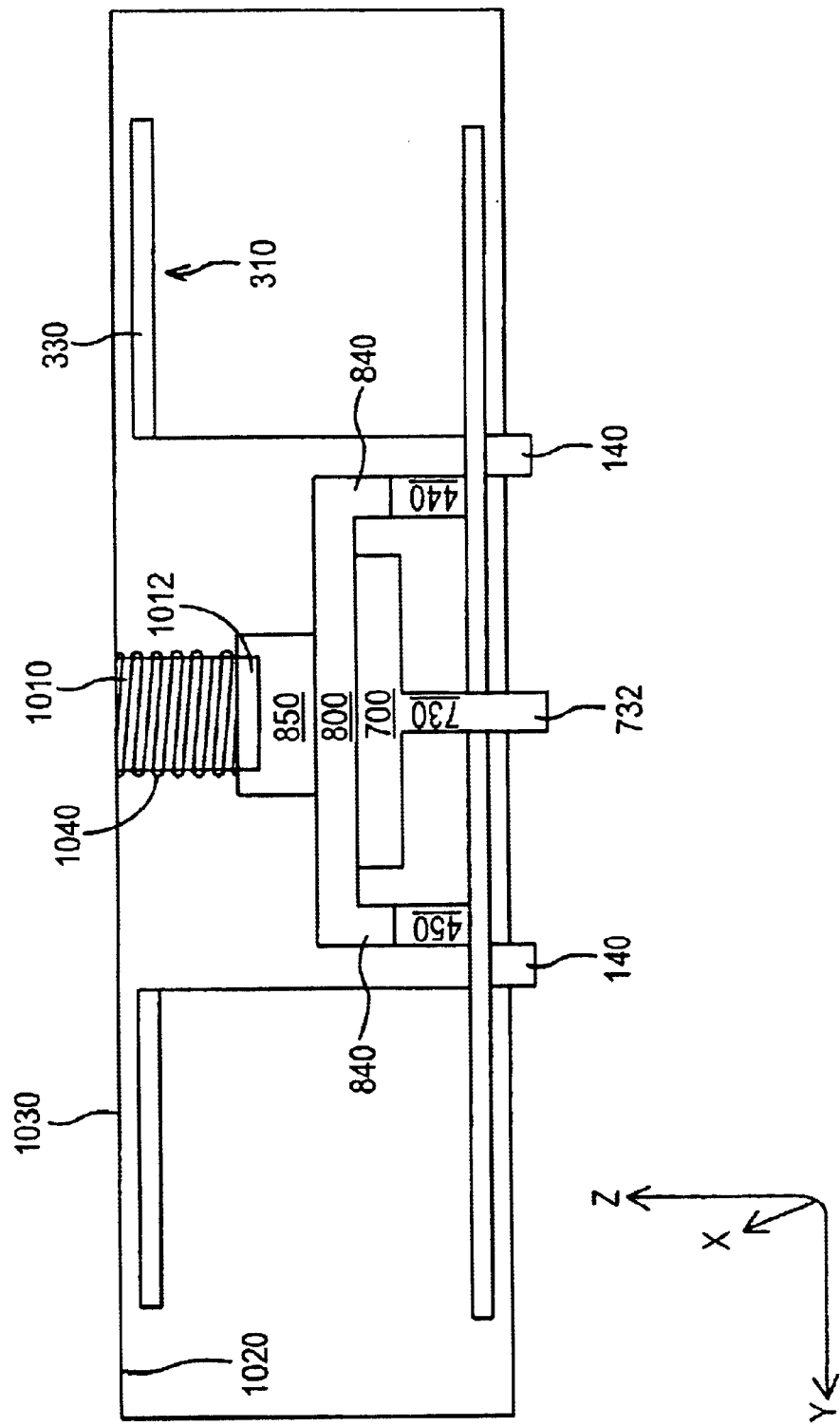
FIG. 10 is a cross-sectional view of a first embodiment of Applicants' tape cartridge comprising a single release pin reel lock mechanism, where the tape reel is in a locked configuration.

FIG. 10 shows a cross section view of Applicants' cartridge 100 which includes Applicants' single release pin reel lock mechanism. In the embodiment of FIG. 10 clutch plate 700 (FIG. 7A) is disposed within hub 310 at a first position along the Z axis such that distal end 732 (FIGS. 7A, 7B, 10, 11, 12A, 13A) of release pin 730 (FIGS. 7A, 7B, 10, 11, 12A, 12B, 13A, 13B) extends through aperture 180 (FIGS. 4A, 4B, 5A, 5B, 5C, 5D) (FIGS. 2, 4A, 4B, 5A, 5B, 5C, 5D). Distal end 732 extends outwardly from cartridge 100. Brake plate 800 (FIGS. 8A, 8B, 9, 10, 11, 12A, 13A, 13B) is rotatably disposed on side 720 (FIG. 7A) of clutch plate 700. Member 1010 is attached to interior surface 1020 of housing 1030 and extends inwardly therefrom. Distal end 1012 of member 1010 extends into aperture 854 (FIG. 8) of assembly 850 (FIG. 8). Insertion of distal end 1012 into aperture 854 allows brake plate 800 to move in the +Z or in the −Z direction, but does not allow rotation of brake plate 800 around the Z axis.

With clutch plate 700 in the first position as shown in FIG. 10, gear 840 intermeshes with gear teeth 440 (FIGS. 4A, 4B, 5A, 5C, 10, 11, 12A, 13A), gear teeth 450 (FIGS. 4A, 4B, 5A, 5C, 10, 11, 12A, 13A), and gear teeth 465 (FIGS. 5A, 5C). As described above, brake plate 800 cannot rotate around the Z axis. When the gear portions 840 intermesh with the gear portions 440, 450, and 465, hub 320 cannot rotate around the Z axis. Therefore, in the locked configuration of FIG. 10, reel 310 cannot rotate around the Z axis. In certain embodiments, cartridge 100 (FIGS. 1, 2, 3) includes biasing device 1040 (FIGS. 10, 11, 12A, 13A, 13B) which pushed clutch plate 700 in the −Z direction to the first position with a first force. In certain embodiments, biasing device 1040 comprises a spring wound around member 1010 and disposed between inner surface 1020 (FIGS. 10, 12A, 13A) and assembly 850 (FIGS. 8A, 10, 12A, 13A, 13B).

Figure 11:
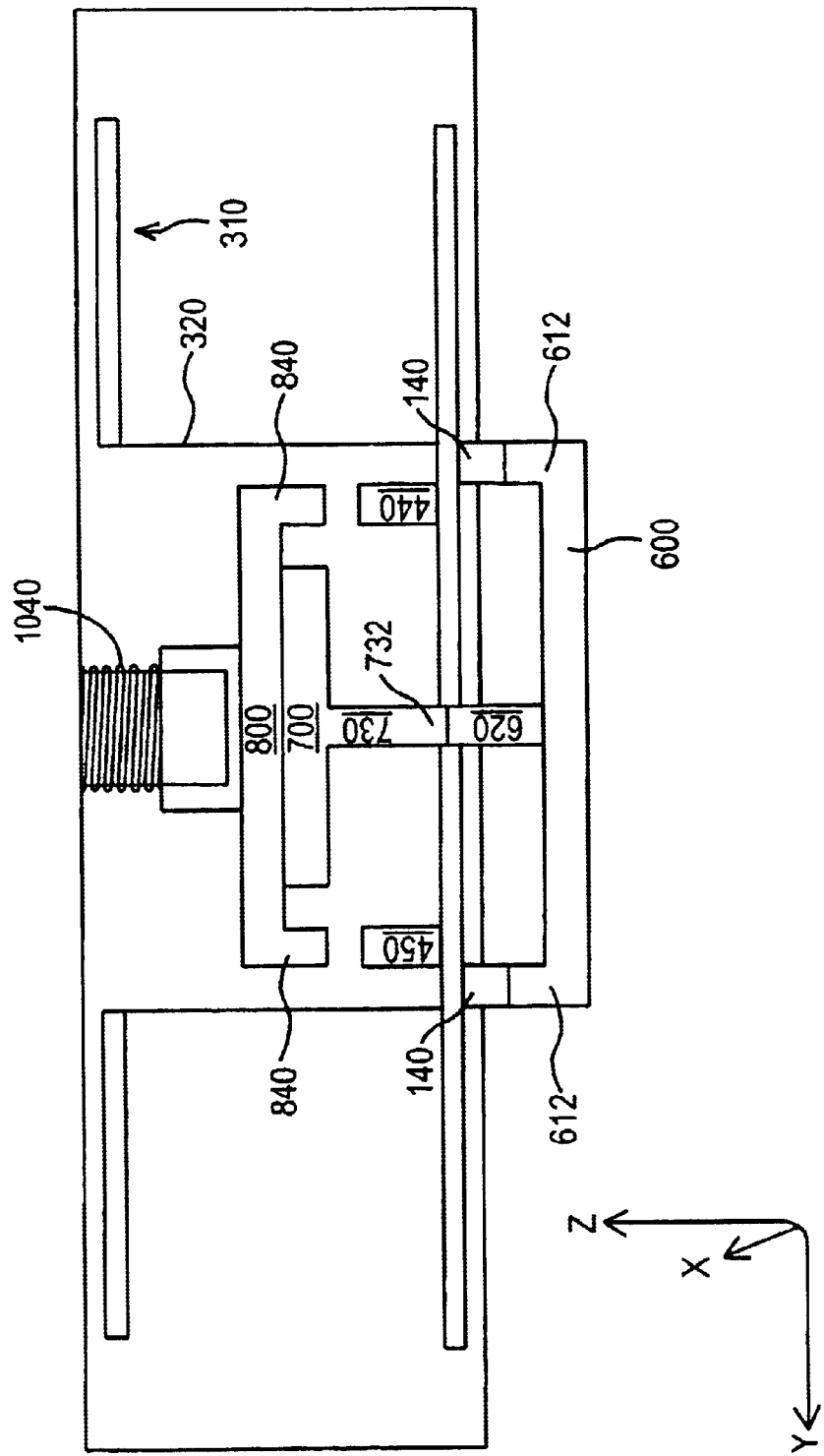
FIG. 11 is a cross-sectional view of the tape cartridge of FIG. 10 in an unlocked configuration.

Referring now to FIG. 11, when drive motor coupling 600 is mated with reel coupling 140 (FIGS. 2, 4A, 4B, 5B, 5D, 10, 11, 12A, 13A, 13B), gear teeth 612 intermesh with gear teeth 140. If a second force greater than the first force described above is applied to drive motor coupling in the +Z direction, member 620 urges distal end 732 (FIGS. 7A, 7B, 10, 11, 12A, 13A) of release pin 730 (FIGS. 7A, 7B, 10, 11, 12A, 12B, 13A, 13B) in the +Z direction. Pushing release pin 730 in the +Z direction, moves brake plate 800 (FIGS. 8A, 8B, 9, 10, 11, 12A, 13A, 13B) to a second position along the +Z direction as shown in FIG. 11. Moving brake plate 800 to the second position disengages gear 840 from gear teeth 440, 450, and 465. When gear 840 no longer intermeshes with gear teeth 440, 450, or 465, then hub 320 can rotate around the Z axis. Thus, mating motor coupling 600 with reel coupling 140, and applying a suitable force to motor coupling 600 in the +Z direction unlocks reel 310, and permits rotation of reel 310 around the Z axis.

When tape cartridge 100 (FIGS. 1, 2, 3) is removeably disposed in, i.e. mounted in, Applicants' data storage device, such as data storage drive 1430 (FIGS. 14, 15)/1440 (FIG. 14), drive motor coupling 600 (FIG. 6) of the data storage device mates with reel coupling 140 and unlocks reel 310. As those skilled in the art will appreciate, drive motor coupling 600 is connected to a drive mechanism disposed within the data storage device. In response to signals from a tape drive controller, the drive motor mechanism rotates drive motor coupling 600, thereby rotating reel 310. The operation of the drive motor mechanism is coordinated with the remainder of the tape drive mechanism to draw tape 102 from housing 100 (FIGS. 1, 2, 3) for use in the tape drive mechanism to, for example, read and/or write data thereon.

FIG. 12A shows a cross section view of a first embodiment of Applicants' housing 100 comprising a four release pin reel lock mechanism. Applicants' four release pin reel lock mechanism is compatible with a wide variety of tape drives. Clutch plate 702 (FIG. 7B) is disposed within hub 312 (FIG. 3) such that distal end 732 (FIGS. 7A, 7B, 10, 11, 12A, 13A) of release pin 730 extends through aperture 180 (FIGS. 4A, 4B, 5A, 5B, 5C, 5D) (FIGS. 2, 4A, 4B, 5A, 5B, 5C, 5D). Distal end 732 (FIGS. 7A, 7B, 10, 11, 12A, 13A) extends outwardly from cartridge 100 (FIGS. 1, 2, 3). Distal end 742 (FIGS. 7B, 12A, 13A) of release pin 740 (FIGS. 7B, 12A, 13A, 13B) extends through aperture 150 (FIGS. 2, 4B, 5C, 5D). Distal end 752 (FIGS. 7B, 12A, 13A, 13B) of release pin 750 (FIGS. 7B, 12A, 13A, 13B) extends through aperture 160 (FIGS. 2, 4B, 5C, 5D). Distal end 762 (FIG. 7B) of release pin 760 (FIG. 7B) extends through aperture 170 (FIGS. 2, 5C, 5D). Distal ends 742, 752, and 762, extend outwardly from cartridge 100.

Brake plate 800 (FIGS. 8A, 8B, 9, 10, 11, 12A, 13A, 13B) is rotatably disposed on side 720 (FIG. 7B) of clutch plate 702 (FIG. 7B). Member 1010 (FIGS. 10, 11, 12, 13) is attached to top interior surface 1020 (FIGS. 10, 12A, 13A, 13B) of housing 1030 and extends inwardly therefrom.

Distal end 1012 (FIGS. 10, 12A) of member 1010 (FIGS. 10, 11, 12A, 13A), extends into aperture 854 (FIG. 8A) of assembly 850 (FIGS. 8A, 10, 12A, 13A). Insertion of distal end 1012 into aperture 854 allows brake plate 800 to move in the +Z or in the −Z direction, but does not allow rotation of brake plate 800 around the Z axis.

In the locked configuration of FIG. 12A, clutch plate 702 is disposed in a first position along the Z axis such that gear 840 (FIGS. 8A, 8B) intermeshes with gear teeth 440 (FIGS. 4A, 4B, 5A, 5C, 10,11, 12A, 13A), gear teeth 450 (FIGS. 4A, 4B, 5A, 5C, 10, 11, 12A, 13A), and gear teeth 465 (FIGS. 5A, 5C). As discussed above, brake plate 800 cannot rotate around the Z axis. When the gear 840 intermesh with the gear teeth 440, 450, and 465, hub 322 (FIG. 3) cannot rotate around the Z axis. Therefore, in the locked configuration of FIG. 12, reel 312 cannot rotate around the Z axis. In certain embodiments, cartridge 100 includes biasing device 1040 (FIGS. 10, 11, 12A, 13A, 13B) which biases clutch plate 702 in the −Z direction with a first force to the first position. In certain embodiments, biasing device 1040 comprises a spring wound around member 1010 and disposed between inner surface 1020 (FIGS. 10, 12A, 13A) and assembly 850.

FIG. 12B shows a second embodiment of Applicants' four release pin reel lock mechanism. In this embodiment, release pin 730 (FIGS. 7A, 7B, 10, 11, 12A, 12B, 13A, 13B) extends farther outwardly from cartridge 100 (FIGS. 1, 2, 3) than do release pins 740 (FIGS. 7B, 12A, 13A, 13B), 750, or 760. Release pin 730 extends a distance 1230 outwardly from interior surface 1221. Release pin 740 extends a distance 1240 outwardly from interior surface 1221. Release pin 750 extends a distance 1250 outwardly from interior surface 1221. Release pin 760 (not shown in FIG. 12B) extends a distance 1260 (not shown in FIG. 12B) outwardly from interior surface 1221. Distances 1240, 1250, and 1260, are substantially the same. By "substantially the same", Applicants mean within about plus or minus ten percent (10%). In this embodiment, distance 1230 is greater than any of distances 1240, 1250, and/or 1260.

Figure 13B:
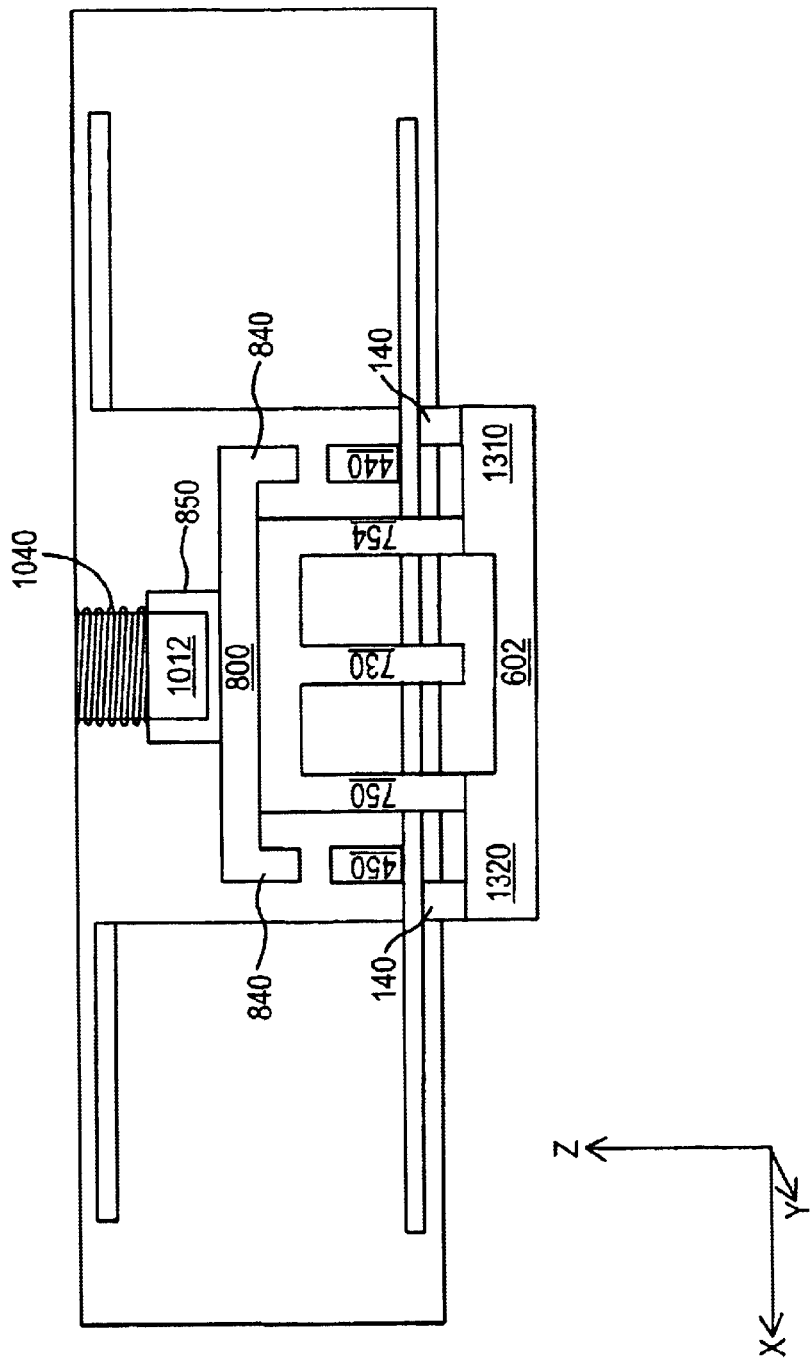
FIG. 13B is a cross-sectional view of the tape cartridge of FIG. 12A in combination with a second configuration of tape drive motor coupling.

Referring now to FIG. 13A, when Applicants' tape cartridge 100 (FIG. 1) having a four release pin reel lock mechanism is inserted into a tape drive comprising a drive motor coupling similar to coupling 600 (FIG. 6A), that drive motor coupling mates with reel coupling 140 (FIGS. 2, 4A, 4B, 5B, 5D, 10, 11, 12A, 13A, 13B) (FIGS. 2, 5B, 5D, 10, 11, 12, 13) such that gear teeth 612 (FIGS. 6A, 6B) intermesh with gear teeth 142 (FIGS. 5B, 5D). If a second force greater than the first force described above is applied to the drive motor coupling in the +Z direction, one of gear teeth 612, i.e. gear tooth 1310, urges distal end 742 (FIGS. 7B, 12A, 13A) (FIGS. 7B, 12, 13) of release pin 740 (FIGS. 7B, 12A, 13A, 13B) in the +Z direction, a second one of gear teeth 612, i.e. gear tooth 1320, urges distal end 752 (FIGS. 7B, 12A, 13A, 13B) of release pin 750 (FIGS. 7B, 12, 13) in the +Z direction, and a third one of gear teeth, 612, i.e. gear tooth 1330 (not shown in FIG. 13A), urges distal end 762 (FIG. 7B) of release pin 760 (FIG. 7B) in the +Z direction.

Moving release pins 740, 750, and 760, in the +Z direction with such a second force, moves brake plate 800 (FIGS. 8A, 8B, 9, 10, 11, 12A, 13A, 13B) in the +Z direction to a second position as shown in FIG. 13A. Moving brake plate 800 to this second position disengages gear 840 from gear teeth 440 (FIGS. 4A, 4B, 5A, 5C, 10, 11, 12A, 13A), 450 (FIGS. 4A, 4B, 5A, 5C, 10, 11, 12A, 13A), and 465 (FIGS. 5A, 5C). When gear 840 no longer intermesh with gear teeth 440, 450, or 465, then hub 322 can rotate around the Z axis.

Thus, inserting Applicants' four release pin tape cartridge into a tape drive comprising motor coupling 600 and the subsequent mating of motor coupling 600 with reel coupling 140 (FIGS. 2, 4A, 4B, 5B, 5D, 10, 11, 12A, 13A, 13B) unlocks reel 312 and permits rotation of reel 312 around the Z axis.

In addition to the movement of release pins 740, 750, and 760, in the +Z direction, member 620 (FIGS. 6A, 6B, 11, 13) urges distal end 732 (FIGS. 7A, 7B, 10, 11, 12A, 13A) of release pin 730 (FIGS. 7A, 7B, 10, 11, 12A, 12B, 13A, 13B) (FIGS. 7A, 7B, 10, 12) in the +Z direction. Pushing release pin 730 in the +Z direction with a second force, where that second force is greater than the biasing first force, moves brake plate 800 in the +Z direction to the second position described above.

In the embodiment of Applicants' tape cartridge shown in FIG. 12B, release pin 730 extends outwardly from surface 1221 more than do release pins 740, 750, and/or 760. The additional exterior length of release pin 730 ensures that even if the motor coupling 600 and reel coupling 140 mate such that release pins 740, 750, and/or 760 are not moved sufficiently in the +Z direction to unlock hub 310, release pin 730 will nevertheless be moved sufficiently in the +Z direction to unlock hub 310, and thereby allow access to the magnetic tape disposed within tape cartridge 100 (FIGS. 1, 2, 3).

Referring now to FIG. 13B, when Applicants' tape cartridge 100 having a four release pin reel lock mechanism is inserted into a tape drive comprising drive motor coupling similar to coupling 602, that motor coupling mates with reel coupling 140 (FIGS. 2, 4A, 4B, 5B, 5D, 10, 11, 12A, 13A, 13B). Gear teeth 612 (FIGS. 6A, 6B) intermesh with gear teeth 142 (FIGS. 5B, 5D), one of gear teeth 612, i.e. gear tooth 1310, urges distal end 742 (FIGS. 7B, 12A, 13A) (FIGS. 7B, 12A, 13A, 13B) of release pin 740 (FIGS. 7B, 12A, 13A, 13B) in the +Z direction, a second one of gear teeth 612, i.e. gear tooth 1320, urges distal end 752 (FIGS. 7B, 12A, 13A, 13B) of release pin 750 (FIG. 7B, 12A, 13A, 13B) (FIGS. 7B, 12, 13) in the +Z direction, and a third one of gear teeth, 612, i.e. gear tooth 1330 (not shown in FIG. 13A), urges distal end 762 (FIG. 7B) of release pin 760 (FIG. 7B) in the +Z direction.

Pushing release pins 740, 750, and 760, in the +Z direction with a second force, where that second force is greater than the biasing first force, moves brake plate 800 (FIGS. 8A, 8B, 9, 10, 11, 12A, 13A, 13B) in the +Z direction to a second position shown in FIG. 13B. Moving brake plate 800 to this second position disengages gear 840 from gear teeth 440, 450, and 465 (not shown in FIG. 13B). When gear 840 no longer intermesh with gear teeth 440, 450, or 465, then hub 322 can rotate around the Z axis. Thus, inserting Applicants' four release pin tape cartridge into a tape drive comprising motor coupling 602 and the subsequent mating of motor coupling 602 with reel coupling 140 unlocks reel 312 and permits rotation of reel 312 around the Z axis.

When tape cartridge 100 (FIGS. 1, 2, 3) is removeably disposed in, i.e. mounted in, Applicants' data storage device, such as data storage drive 1430 (FIGS. 14, 15)/1440 (FIG. 14), drive motor coupling 602 (FIG. 6B) of the data storage device mates with reel coupling 140 and unlocks reel 312. As those skilled in the art will appreciate, drive motor coupling 602 is connected to a drive mechanism disposed within the data storage device. In response to signals from a tape drive controller, the drive mechanism rotates drive motor coupling 602, thereby rotating reel 312. The operation of the drive motor mechanism is coordinated with the remainder of the tape drive mechanism to draw tape 102 from housing 100 for use in the tape drive mechanism to, for example, read and/or write data thereon.

Figure 14:
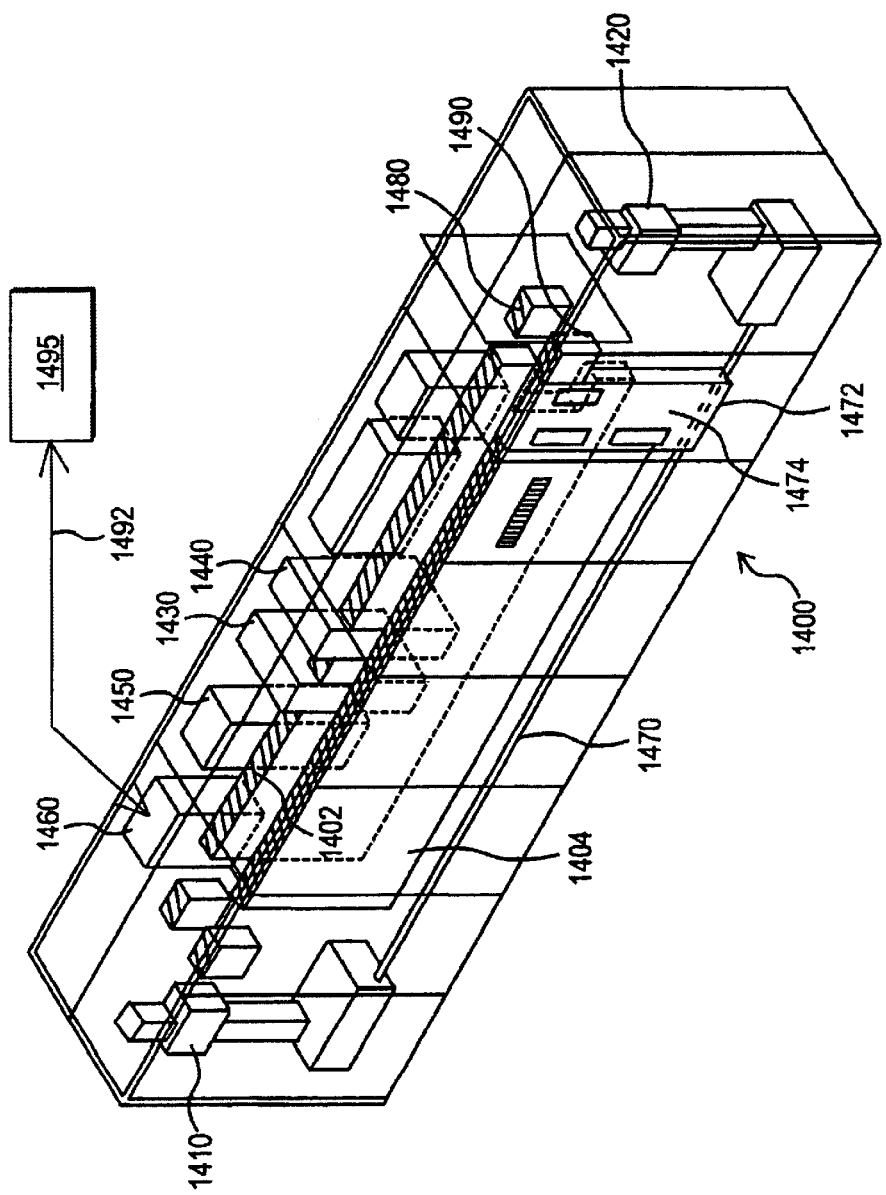
FIG. 14 is a perspective view of a first embodiment of Applicants' data storage and retrieval system.

Referring now to FIG. 14, data storage and retrieval system 1400 communicates with one or more host computers, such as host computer 1495, via one or more communication links, such as communication link 1492. Communication link 1492 comprises, for example, a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof Data storage and retrieval system 1400 includes first wall of storage slots 1402 and second wall of storage slots 1404. Portable information storage media are individually stored in these storage slots. Such information storage media are individually housed in Applicants' cartridge 100 (FIGS. 1, 2, 3).

Applicant's automated data storage and retrieval system includes one or more accessors, such as accessors 1410 and 1420. An accessor is a robotic device which accesses portable data storage media from first storage wall 1402 or second storage wall 1404, transports that accessed media to input/output devices 1430/1440 for reading and/or writing data thereon, and returns the media to the proper storage slot. As shown in FIG. 14, accessors 1410 and 1420 travel bi-directionally along rail 1470 in an aisle disposed between first wall of storage slots 1402 and second wall of storage slots 1404. U.S. Pat. No. 6,038,490, entitled "Automated Data Storage Dual Picker Interference Avoidance", teaches a method to prevent collisions occurring between accessors moveably disposed on the same rail system, and is hereby incorporated by reference herein.

In certain embodiments, device 1460 comprises a library controller. In certain of these embodiments, library controller 1460 is integral with a computer. In other embodiments, Applicants' data storage and retrieval system utilizes a distributed control network. In these distributed control network embodiments, device 1460 comprises a motion card pack.

Operator input station 1450 permits a user to communicate with Applicant's automated data storage and retrieval system 1400. Power component 1480 and power component 1490 each comprise one or more power supply units which supply power to the individual components disposed within Applicant's automated data storage and retrieval system. Import/export station 1472 includes access door 1474 pivotably attached to the side of system 1400. Portable data storage media can be placed in the system, or in the alternative, removed from the system, via station 1472 and access door 1474.

Figure 15:
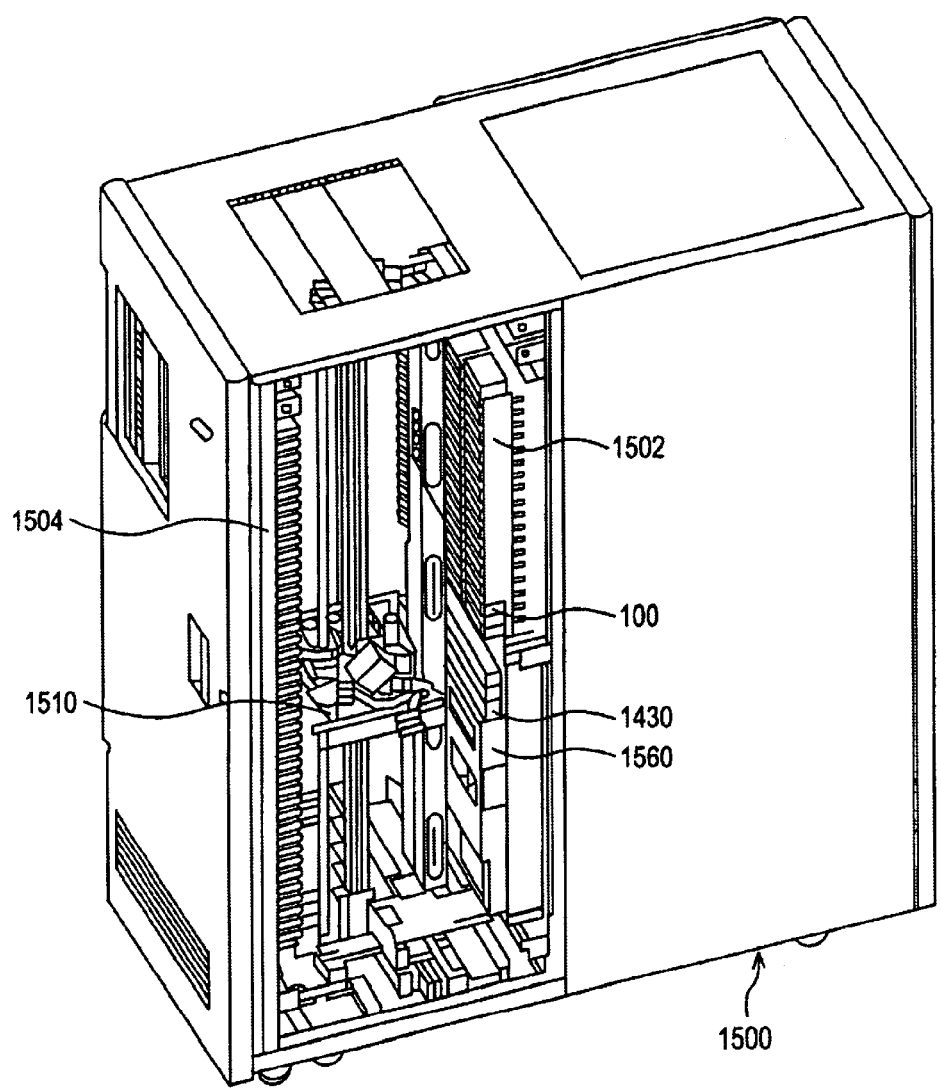
FIG. 15 is a perspective view of a second embodiment of Applicants' data storage and retrieval system.

FIG. 15 shows system 1500 which comprises another embodiment of Applicant's data storage and retrieval system. System 1500 communicates with one or more host computers' such as host computer 1495 (FIG. 14), via one or more communication links, such as communication link 1492 (FIG. 14).

System 1500 includes first storage wall 1502 and second storage wall 1504. Storage walls 1502 and 1504 each include a plurality of storage elements in which can be stored a plurality of Applicants' cartridges 100 (FIGS. 1, 2, 3). System 1500 includes one or more input/output devices, such as device 1430. System 1500 further includes controller/motion card pack 1560. System 1500 further includes operator control panel 1550 (not shown in FIG. 15).

System 1500 further includes one or a plurality of portable data storage cartridges 100 (FIGS. 1, 2, 3) (FIG. 1) removeably disposed in one or more slots in storage walls 1502/1504. System 1500 also includes at least one robotic accessor 1510 for transporting a designated portable data storage cartridge 100 between a storage slot disposed in first wall 1502 or second wall 1504 and input/output device 1430.

While the preferred embodiments of the present invention have been illustrated in detail, it should be apparent that modifications and adaptations to those embodiments may occur to one skilled in the art without departing from the scope of the present invention as set forth in the following claims.

We claim:

1. A tape cartridge, comprising:
   a housing;
   a tape reel disposed within said housing, wherein said tape reel is capable of rotation around a first axis, and wherein said tape reel comprises a hub and a reel coupling engageable with a motor coupling for rotation of said tape reel, wherein said hub is formed to include a first aperture located at the axis of rotation of said hub;
   a brake plate disposed within said hub, wherein said brake plate is capable of moving in a first direction and in an opposing second direction along said first axis, and wherein said brake plate is not capable of rotation around said first axis, said brake plate comprising a first side, an opposing second side, a brake plate gear disposed on said second side, and a fixturing assembly disposed on said first side;
   a clutch plate disposed within said hub, wherein said clutch plate is capable of moving in a first direction and in an opposing second direction along said first axis, and wherein said clutch plate is capable of rotation around said first axis, and wherein said clutch plate comprises a first side, an opposing second side, and a first release pin, wherein said second side of said clutch plate is rotatably disposed on said second side of said brake plate, and wherein said first release pin is disposed on said first side of said clutch plate, and wherein said first release pin comprises a distal end which extends through said first aperture, and extends outwardly from said housing.

2. The tape cartridge of claim 1, wherein said hub comprises:
   a circular wall;
   a floor;
   a plurality of gear teeth disposed on said floor, wherein each of said plurality of gear teeth extends inwardly from said wall toward said first aperture.

3. The tape cartridge of claim 2, wherein said clutch plate can be moved between a first position along said first axis and a second position along said first axis, wherein when said clutch plate is disposed in said first position said brake plate gear intermeshes with said plurality of gear teeth, and wherein when said clutch plate is disposed in said second position said brake plate gear does not intermesh with said plurality of gear teeth.

4. The tape cartridge of claim 3, wherein when said clutch plate is disposed in said first position said tape reel cannot be rotated around said first axis, and wherein when said clutch plate is disposed in said second position said tape reel can be rotated around said first axis.

5. The tape cartridge of claim 4, further comprising a biasing device that biases said clutch plate in said first position.

6. The tape cartridge of claim 2, wherein said hub comprises a diameter, and wherein said clutch plate comprises an equilateral triangle having a first corner, a second corner, and a third corner, and wherein the length of each side of said equilateral triangle is less than said diameter.

7. The tape cartridge of clam 6, wherein said hub floor is formed to include a second aperture, a third aperture, and a fourth aperture, wherein said second aperture and said third aperture and said fourth aperture are located adjacent said circular wall and are equidistant from each other;

wherein said clutch plate further comprises:

a second release pin disposed on said second surface of said clutch plate adjacent said first corner, wherein said second release pin comprises a second distal end extending through said second aperture and outwardly from said housing;

a third release pin disposed on said second surface of said clutch plate adjacent said second corner, wherein said third release pin comprises a third distal end extending through said third aperture and outwardly from said housing; and a fourth release pin disposed on said second surface of said clutch plate adjacent said third corner, wherein said fourth release pin comprises a fourth distal end extending through said fourth aperture and outwardly from said housing.

8. The tape cartridge of claim 7, wherein said clutch plate can be moved between a first position along said first axis and a second position along said first axis, wherein when said clutch plate is disposed in said first position said brake plate gear intermeshes with said plurality of gear teeth, and wherein when said clutch plate is disposed in said second position said brake plate gear does not intermesh with said plurality of gear teeth.

9. The tape cartridge of claim 8, wherein when said clutch plate is disposed in said first position said tape reel cannot be rotated around said first axis, and wherein when said clutch plate is disposed in said second position said tape reel can be rotated around said first axis.

10. The tape cartridge of claim 9, further comprising a biasing device that biases said clutch plate in said first position.

11. A data storage and retrieval system, comprising:

one or more portable information storage media, wherein one or more of said one or more portable information storage media comprise a magnetic tape disposed in a tape cartridge, wherein said tape cartridge comprises:

a housing;

a tape reel disposed within said housing, wherein said tape reel is capable of rotation around a first axis, and wherein said tape reel comprises a hub and a reel coupling engageable with a motor coupling for rotation of said tape reel, wherein said hub is formed to include a first aperture located at the axis of rotation of said hub;

a brake plate disposed within said hub, wherein said brake plate is capable of moving in a first direction and in an opposing second direction along said first axis, and wherein said brake plate is not capable of rotation around said first axis, said brake plate comprising a first side, an opposing second side, a brake plate gear disposed on said second side, and a fixturing assembly disposed on said first side;

a clutch plate disposed within said hub, wherein said clutch plate is capable of moving in a first direction and in an opposing second direction along said first axis, and wherein said clutch plate is capable of rotation around said first axis, and wherein said clutch plate comprises a first side, an opposing second side, and a first release pin, wherein said second side of said clutch plate is rotatably disposed on said second side of said brake plate, and wherein said first release pin is disposed on said first side of said clutch plate, and wherein said first release pin comprises a distal end which extends through said first aperture, and extends outwardly from said housing.

12. The data storage and retrieval system of claim 11, wherein said hub comprises:

a circular wall;

a floor; and a plurality of gear teeth disposed on said floor, wherein each of said plurality of gear teeth extends inwardly from said wall toward said first aperture.

13. The data storage and retrieval system of claim 12, wherein said clutch plate can be moved between a first position along said first axis and a second position along said first axis, wherein when said clutch plate is disposed in said first position said brake plate gear intermeshes with said plurality of gear teeth, and wherein when said clutch plate is disposed in said second position said brake plate gear does not intermesh with said plurality of gear teeth.

14. The data storage and retrieval system of claim 13, wherein when said clutch plate is disposed in said first position said tape reel cannot be rotated around said first axis, and wherein when said clutch plate is disposed in said second position said tape reel can be rotated around said first axis.

15. The data storage and retrieval system of claim 14, wherein said tape cartridge further comprises a biasing device that biases said clutch plate in said first position.

16. The data storage and retrieval system of claim 12, wherein said hub comprises a diameter, and wherein said clutch plate comprises an equilateral triangle having a first corner, a second corner, and a third corner, and wherein the length of each side of said equilateral triangle is less than said diameter.

17. The data storage and retrieval system of clam 16, wherein said hub floor is formed to include a second aperture, a third aperture, and a fourth aperture, wherein said second aperture and said third aperture and said fourth aperture are located adjacent said circular wall and are located equidistant from each other;

wherein said clutch plate further comprises:

a second release pin disposed on said second surface of said clutch plate adjacent said first corner, wherein said second release pin comprises a second distal end extending through said second aperture and outwardly from said housing;

a third release pin disposed on said second surface of said clutch plate adjacent said second corner, wherein said third release pin comprises a third distal end extending through said third aperture and outwardly from said housing; and a fourth release pin disposed on said second surface of said clutch plate adjacent said third corner, wherein said fourth release pin comprises a fourth distal end extending through said fourth aperture and outwardly from said housing.

18. The data storage and retrieval system of claim 17, wherein said clutch plate can be moved between a first position along said first axis and a second position along said first axis, wherein when said clutch plate is disposed in said first position said brake plate gear intermeshes with said plurality of gear teeth, and wherein when said clutch plate is disposed in said second position said brake plate gear does not intermesh with said plurality of gear teeth.

19. The data storage and retrieval system of claim 18, wherein when said clutch plate is disposed in said first position said tape reel cannot be rotated around said first axis, and wherein when said clutch plate is disposed in said second position said tape reel can be rotated around said first axis.

20. The data storage and retrieval system of claim 19, wherein said tape cartridge further comprises a biasing device that biases said clutch plate in said first position.

21. The data storage and retrieval system of claim 20, further comprising a data storage device, wherein said data storage device comprises a drive motor mechanism coupled to said motor coupling.

22. A method to read and/or write information on a tape medium disposed in a tape cartridge using a data storage device comprising a motor coupling and a drive mechanism connected to said motor coupling, wherein said tape cartridge comprises:

a housing;

a tape reel disposed within said housing, wherein said tape reel is capable of rotation around a first axis, and wherein said tape reel comprises a hub and a reel coupling engageable with a motor coupling for rotation of said tape reel, wherein said hub is formed to include a first aperture located at the axis of rotation of said hub, wherein said hub comprises a circular wall, a floor, and a plurality of gear teeth disposed on said floor, wherein each of said plurality of gear teeth extends inwardly from said wall toward said aperture;

a brake plate disposed within said hub, wherein said brake plate is capable of moving in a first direction and in an opposing second direction along said first axis, and wherein said brake plate is not capable of rotation around said first axis, said brake plate comprising a first side, an opposing second side, a brake plate gear disposed on said second side, and a fixturing assembly disposed on said first side;

a clutch plate disposed within said hub, wherein said clutch plate is capable of moving in a first direction and in an opposing second direction along said first axis, and wherein said clutch plate is capable of rotation around said first axis, and wherein said clutch plate comprises a first surface, an opposing second surface, and a first release pin, wherein said second surface of said clutch plate is rotatably disposed on said second side of said brake plate, and wherein said first release pin is disposed on said first surface of said clutch plate, and wherein said first release pin comprises a distal end which extends through said first aperture and outwardly from said housing;

wherein said clutch plate can be moved between a first position along said first axis and a second position along said first axis, wherein when said clutch plate is disposed in said first position said brake plate gear intermeshes with said plurality of gear teeth, and wherein when said clutch plate is disposed in said second position said brake plate gear does not intermesh with said plurality of gear teeth;

wherein when said clutch plate is disposed in said first position said tape reel cannot be rotated around said first axis, and wherein when said clutch plate is disposed in said second position said tape reel can be rotated around said first axis;

said method comprising the steps of:

removeably disposing said tape cartridge in said data storage device;

mating said motor coupling with said reel coupling;

moving said clutch plate from said first position to said second position;

rotating said tape reel;

drawing said tape medium from said housing; and reading and/or writing information from and/or to said tape medium.

23. The method of claim 22, wherein said motor coupling comprises a first side, an opposing second side, a motor coupling gear disposed on said first side, and a first member disposed on said first side, wherein said first member comprises a distal end which extends outwardly from said first side of said motor coupling, said method further comprising the steps of:

intermeshing said motor coupling gear with said reel coupling, contacting said distal end of said first release pin with said distal end of said first member; and pushing said distal end of said first release pin inwardly.

24. The method of claim 23, wherein said tape cartridge further comprises a biasing device which biases said clutch plate in said first position with a first force in a first direction along said first axis, said method further comprising the step of pushing said distal end of said first release pin inwardly with a second force greater than said first force.

25. The method of claim 24, wherein said hub comprises a diameter, and wherein said clutch plate comprises an equilateral triangle having a first corner, a second corner, and a third corner, and wherein the length of each side of said clutch plate is less than said diameter.

26. The method of clam 25, wherein said hub floor is formed to include a second aperture, a third aperture, and a fourth aperture, wherein said second aperture and said third aperture and said fourth aperture are located adjacent said circular wall and are located equidistant from each other;

wherein said clutch plate further comprises:

a second release pin disposed on said second surface of said clutch plate adjacent said first corner, wherein said second release pin comprises a distal end extending through said second aperture and outwardly from said housing;

a third release pin disposed on said second surface of said clutch plate adjacent said second corner, wherein said third release pin comprises a distal end extending through said third aperture and outwardly from said housing; and a fourth release pin disposed on said second surface of said clutch plate adjacent said third corner, wherein said fourth release pin comprises a distal end extending through said fourth aperture and outwardly from said housing;

wherein said motor coupling comprises a plurality of gear teeth;

said method further comprising the steps of:

contacting said distal end of said second release pin with a first one of said plurality of gear teeth;

pushing said distal end of said second release pin inwardly, contacting said distal end of said third release pin with a second one of said plurality of gear teeth;

pushing said distal end of said third release pin inwardly;

contacting said distal end of said fourth release pin with a third one of said plurality of gear teeth; and pushing said distal end of said fourth release pin inwardly.

* * * * *